(12) United States Patent
Choi et al.

(10) Patent No.: US 12,562,361 B2
(45) Date of Patent: Feb. 24, 2026

(54) ELECTRODE MANUFACTURING SYSTEM/METHOD USING HEATED ROLLERS TO PROVIDE EXCELLENT UNIFORMITY OF ELECTRODE SLURRY COATING

(71) Applicant: LG Energy Solution, Ltd., Seoul (KR)

(72) Inventors: Hyun Woo Choi, Daejeon (KR); Sang Hoon Choy, Daejeon (KR); Dong Hun Song, Daejeon (KR); Shin Wook Jeon, Daejeon (KR); Chang Hun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 699 days.

(21) Appl. No.: 17/908,444

(22) PCT Filed: Oct. 8, 2021

(86) PCT No.: PCT/KR2021/013939
§ 371 (c)(1),
(2) Date: Aug. 31, 2022

(87) PCT Pub. No.: WO2022/086009
PCT Pub. Date: Apr. 28, 2022

(65) Prior Publication Data
US 2023/0343918 A1 Oct. 26, 2023

(30) Foreign Application Priority Data

Oct. 23, 2020 (KR) ........................ 10-2020-0138481
Oct. 29, 2020 (KR) ........................ 10-2020-0142411

(51) Int. Cl.
*B05C 5/02* (2006.01)
*B05C 9/14* (2006.01)
(Continued)

(52) U.S. Cl.
CPC ........... *H01M 4/0404* (2013.01); *B05D 1/26* (2013.01); *B05D 3/0272* (2013.01); *H01M 4/04* (2013.01);
(Continued)

(58) Field of Classification Search
None
See application file for complete search history.

(56) References Cited

U.S. PATENT DOCUMENTS

2002/0160101 A1    10/2002  Ikeda et al.
2011/0274828 A1*   11/2011  Nagamatsu ......... H01M 4/0404
                                                            118/58
(Continued)

FOREIGN PATENT DOCUMENTS

CN         102667384 A      9/2012
CN         202700767 U      1/2013
(Continued)

OTHER PUBLICATIONS

International Search Report for PCT/KR2021/013939 dated Jan. 25, 2022. 3 pgs.
(Continued)

*Primary Examiner* — Binu Thomas
(74) *Attorney, Agent, or Firm* — Lerner David LLP

(57) ABSTRACT

The present technology relates to an electrode manufacturing system, and an electrode manufacturing method using the same. According to the present technology, it is possible to uniformly second-coating an electrode slurry as an electrode current collector, which has gone through electrode slurry first coating and drying processes, passes through a heat pipe guide roller.

14 Claims, 11 Drawing Sheets

(51) Int. Cl.

| | | |
|---|---|---|
| *B05D 1/26* | (2006.01) |
| *B05D 3/02* | (2006.01) |
| *H01M 4/04* | (2006.01) |
| *H01M 4/139* | (2010.01) |

(52) U.S. Cl.

CPC ....... *H01M 4/0409* (2013.01); *H01M 4/0471* (2013.01); *B05C 5/0254* (2013.01); *B05C 9/14* (2013.01); *B05D 2252/02* (2013.01); *B05D 2252/10* (2013.01); *H01M 4/139* (2013.01)

(56) References Cited

U.S. PATENT DOCUMENTS

| | | | | |
|---|---|---|---|---|
| 2012/0251734 | A1 | 10/2012 | Yamazaki | |
| 2016/0006018 | A1* | 1/2016 | Wang | H01M 4/0404 |
| | | | | 427/126.6 |
| 2017/0259552 | A1 | 9/2017 | Kang | |
| 2018/0205065 | A1 | 7/2018 | Kim et al. | |
| 2019/0081317 | A1* | 3/2019 | Keil | H01M 4/0404 |
| 2020/0335766 | A1 | 10/2020 | Oh et al. | |
| 2022/0045310 | A1* | 2/2022 | Akira | H01M 4/1393 |

FOREIGN PATENT DOCUMENTS

| | | | |
|---|---|---|---|
| CN | 105103339 | A | 11/2015 |
| JP | H10323605 | A | 12/1998 |
| JP | 2894196 | B2 | 5/1999 |
| JP | 2000326059 | A | 11/2000 |
| JP | 2003093949 | A | 4/2003 |
| JP | 2005276444 | A | 10/2005 |
| JP | 2013134913 | A | 7/2013 |
| JP | 2013258084 | A | 12/2013 |
| JP | 2014032767 | A | 2/2014 |
| JP | 2015144055 | A | 8/2015 |
| JP | 2018158278 | A | 10/2018 |
| KR | 20060111848 | A | 10/2006 |
| KR | 100759385 | B1 | 9/2007 |
| KR | 20110100676 | A | 9/2011 |
| KR | 20150126920 | A | 11/2015 |
| KR | 20150137630 | A | 12/2015 |
| KR | 20170100132 | A | 9/2017 |
| KR | 20170104804 | A | 9/2017 |
| KR | 20200048068 | A | 5/2020 |
| WO | 2017171294 | A1 | 10/2017 |
| WO | WO-2020137436 | A1* | 7/2020 | ......... H01M 4/0404 |

OTHER PUBLICATIONS

Search Report dated Dec. 27, 2024 from the Office Action for Chinese Application No. 202180016040.3 issued Jan. 2, 2025, 3 pages.

Extended European Search Report including Written Opinion for Application No. 21883080.0 dated May 22, 2024, pp. 1-9.

\* cited by examiner

【FIG. 1】
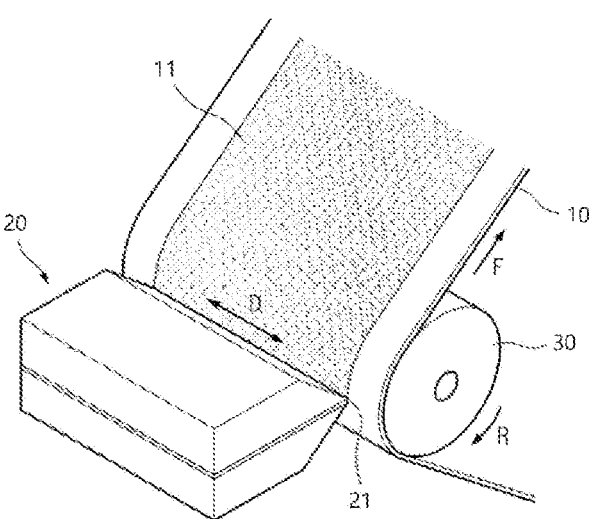

【FIG. 2】
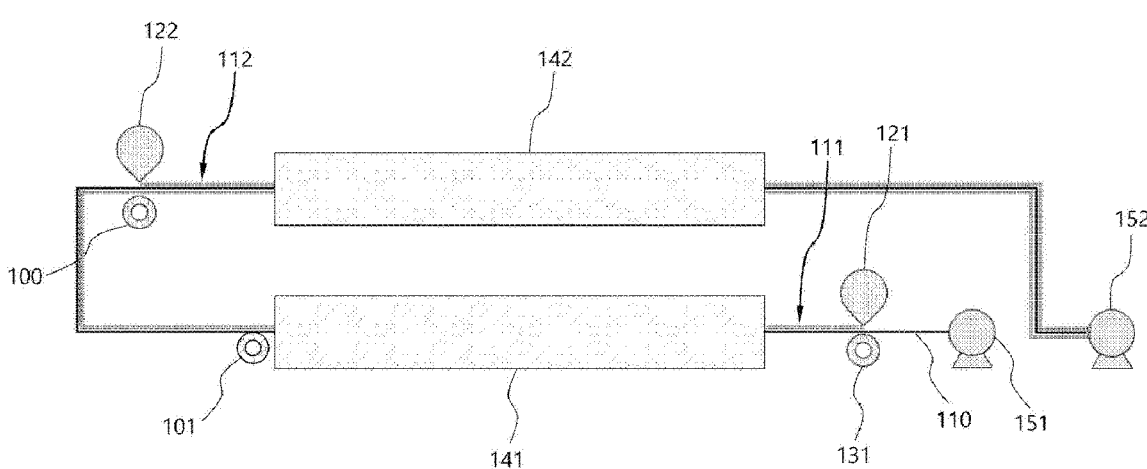

【FIG. 3】
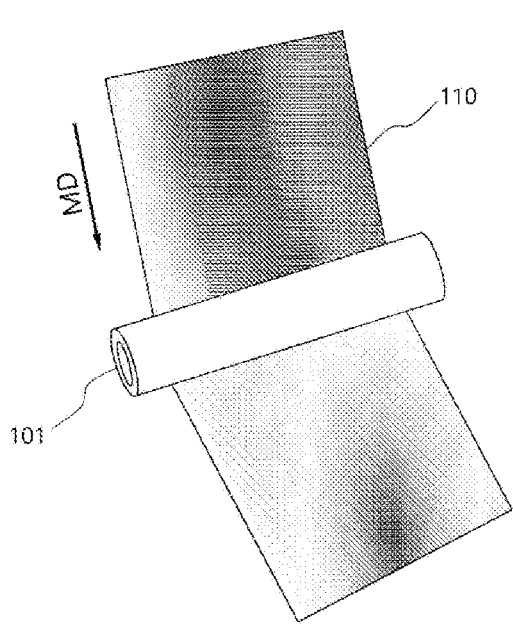

【FIG. 4】
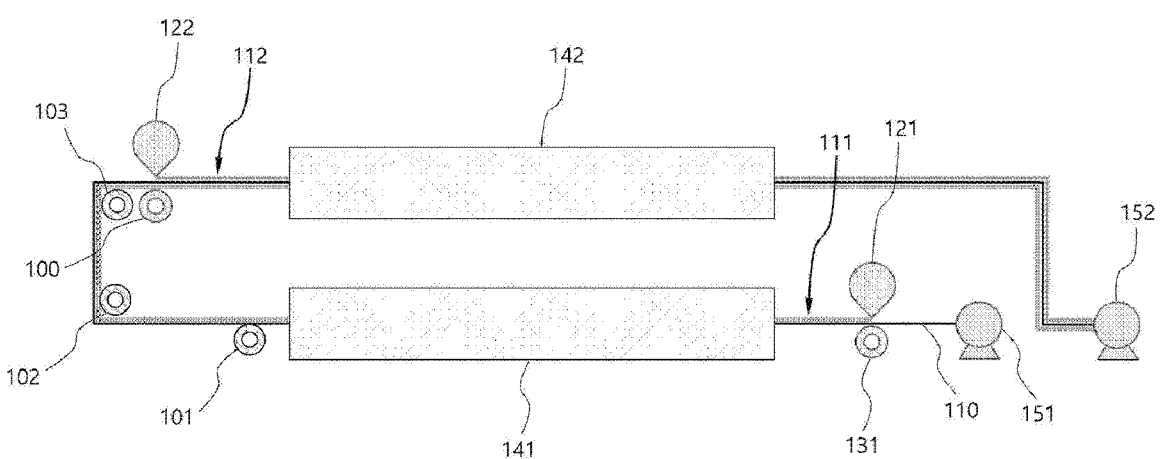

【FIG. 5】
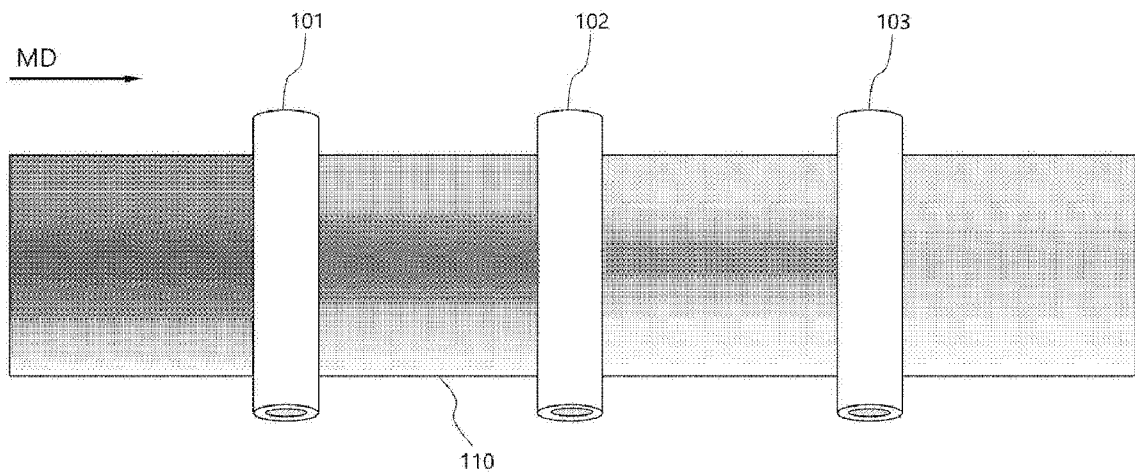

【FIG. 6】
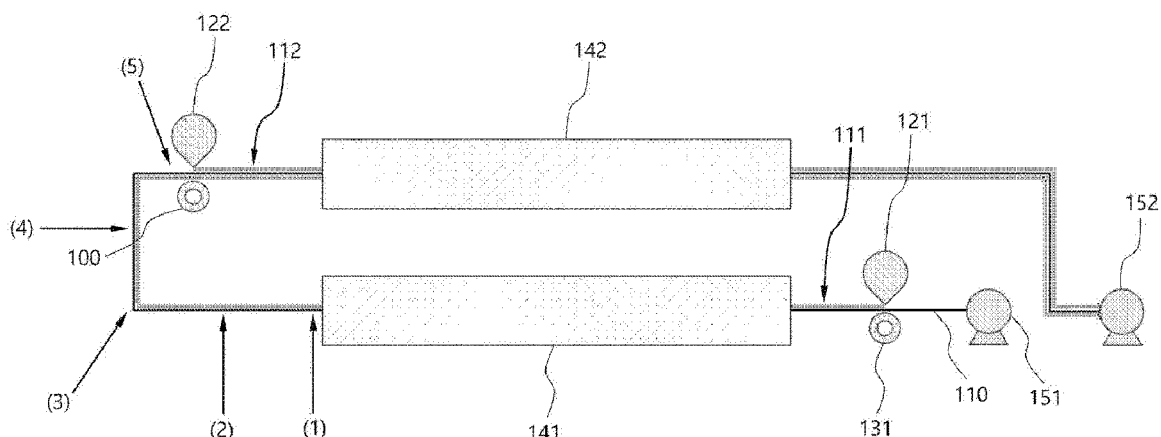

【FIG. 7】
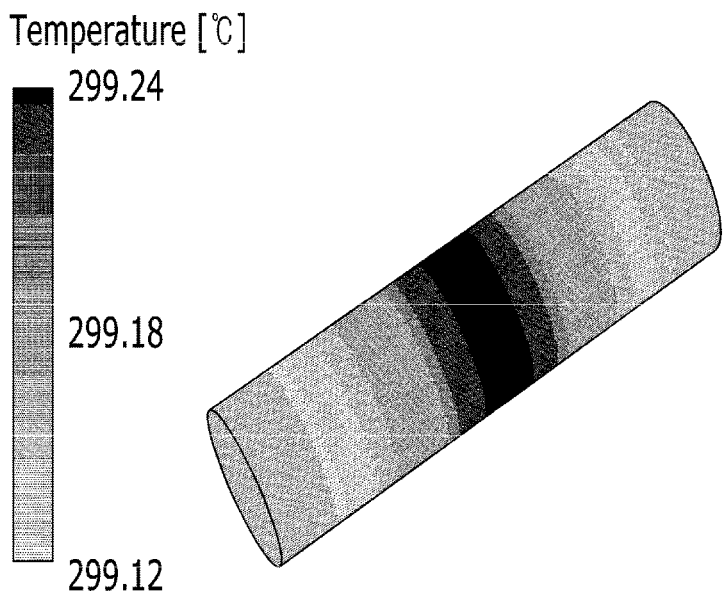
<Temperature change of lower coating roller>

【FIG. 8】
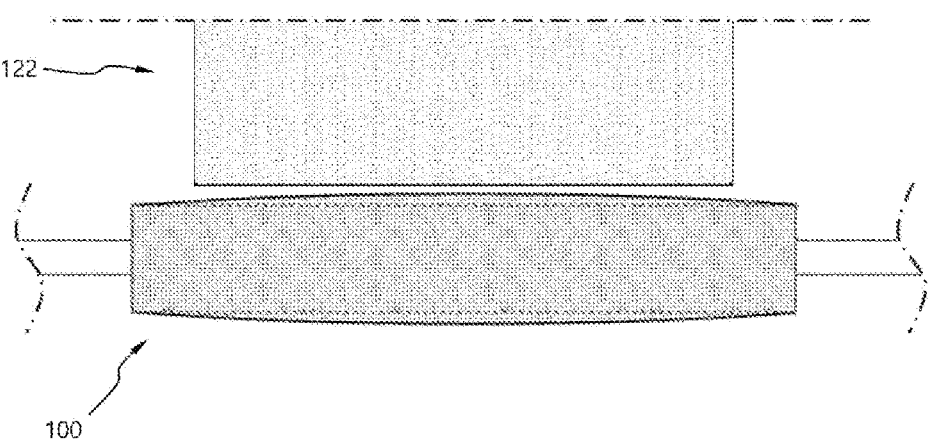

【FIG. 9】
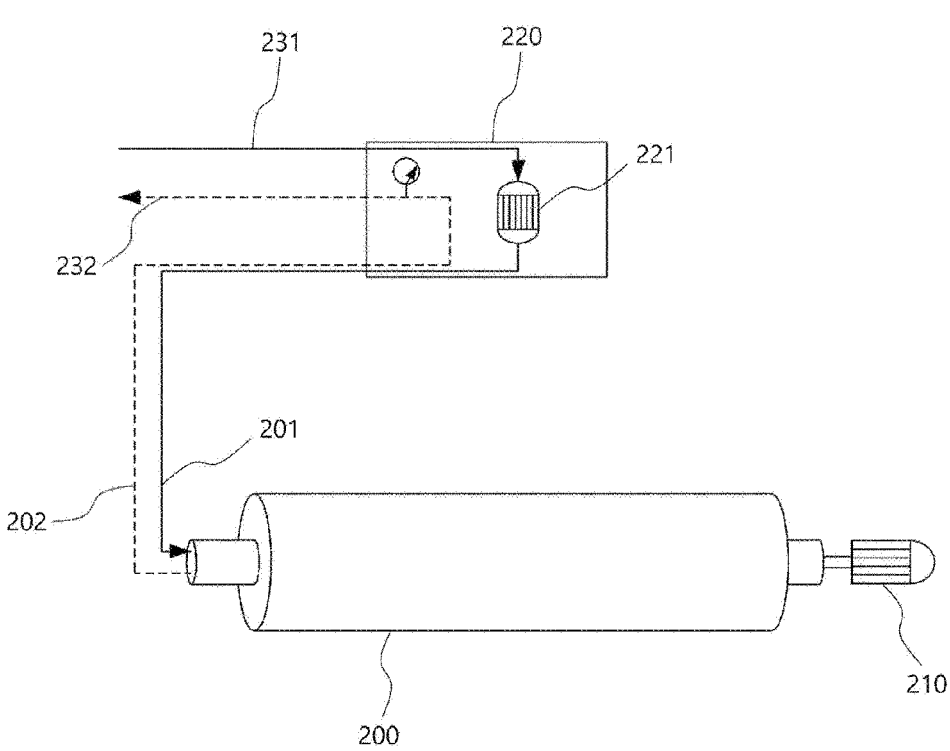

【FIG. 10】
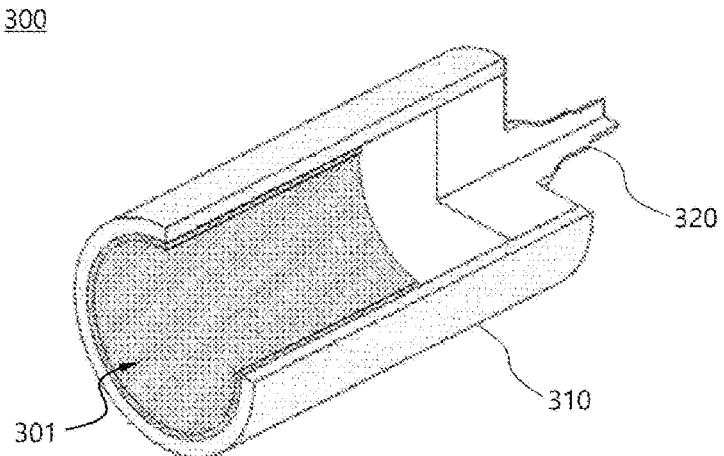

【FIG. 11】
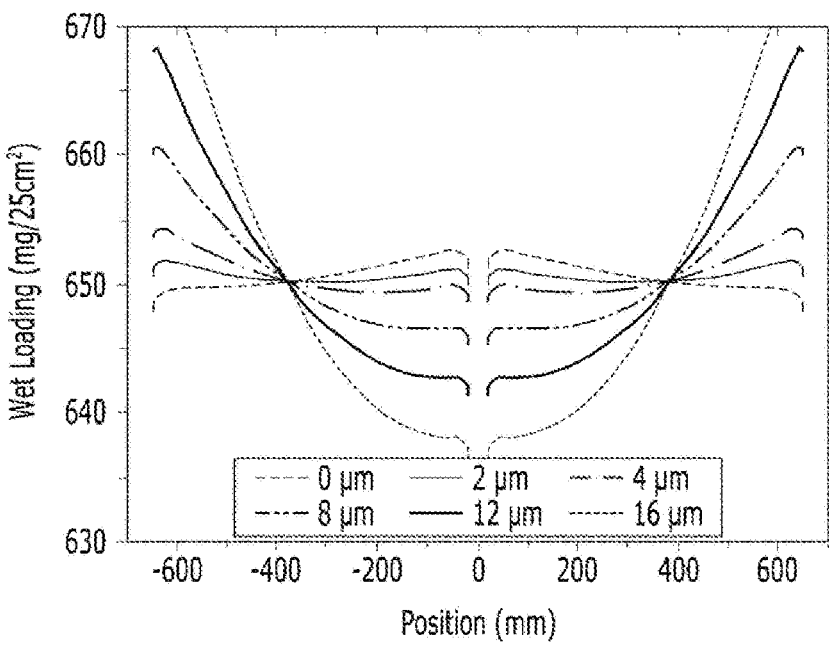

ELECTRODE MANUFACTURING SYSTEM/METHOD USING HEATED ROLLERS TO PROVIDE EXCELLENT UNIFORMITY OF ELECTRODE SLURRY COATING

CROSS-REFERENCE TO RELATED APPLICATIONS

The present application is a national phase entry under 35 U.S.C. § 371 of International Application No. PCT/KR2021/013939, filed on Oct. 8, 2021, which claims priority to Korean Patent Application No. 10-2020-0138481, filed on Oct. 23, 2020, and Korean Patent Application No. 10-2020-0142411, filed on Oct. 29, 2020, the disclosures of which are incorporated herein by reference.

TECHNICAL FIELD

The present disclosure relates to an electrode manufacturing system having excellent electrode slurry coating uniformity, and an electrode manufacturing method using the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

As the field of application for secondary batteries expands, the demand for higher-capacity secondary batteries is increasing rapidly. As a method of increasing the capacity of the secondary battery, research on the technique of increasing the loading amount of the electrode mixture layer is being performed. The electrode for the secondary battery is prepared through the drying and rolling process after coating the electrode slurry on the current collector. However, in order to increase the loading amount of the electrode mixture layer, a large amount of electrode slurry should be coated on the current collector. In order to increase the coating amount of the electrode slurry, a higher level of coating uniformity is required.

FIG. 1 shows a conventional process of manufacturing an electrode. FIG. 1 illustrates a process of discharging an electrode slurry through an electrode slurry slot die on an electrode current collector located on a coating roller. In FIG. 1, an electrode slurry slot die 20 discharges an electrode slurry on an electrode current collector 10 which passes through a coating roller 30 rotating in one direction (R). The electrode current collector 10 is transferred in a machine direction (MD) while passing through the coating roller 30 rotating in one direction (R). The electrode slurry slot die 20 forms an electrode mixing layer 11, where an electrode slurry having a specific width D is coated on an electrode current collector 10, by going through the process of discharging an electrode slurry on the electrode current collector 10 through an electrode slurry discharge unit 21 and drying it.

In order to maintain the thickness of the electrode mixture layer 11 constant, the interval between the electrode slurry discharge unit and the coating roller 10 should be controlled to be constant. In the past, with respect to an electrode slurry coating system, there were attempts to change the location or outer diameter of the coating roller 30 in consideration of the temperature of the outside air. However, these attempts were made only in consideration of the process of coating an electrode slurry on one surface of the electrode current collector 10.

Hence, there is a need for a technology of effectively coating an electrode slurry on two surfaces of an electrode current collector.

DISCLOSURE

Technical Problem

The present technology is believed to solve at least some of the above problems. For example, an aspect of the present invention provides an electrode manufacturing system capable of implementing coating uniformity at the time of coating an electrode slurry on both surfaces of an electrode current collector, and an electrode manufacturing method using the same.

Technical Solution

The present technology provides a method for manufacturing an electrode. In one example, a system for manufacturing an electrode according to the present invention includes: a first coating unit which discharges an electrode slurry to a first surface that is an opposite surface of a surface where an electrode current collector contacts a first coating roller while the electrode current collector passes through the first coating roller; a primary drying furnace which dries the electrode current collector having the first surface on which the electrode slurry has been coated; n heat pipe guide rollers which reduces a temperature deviation in a width direction of the electrode current collector having passed through the primary drying furnace by heating the electrode current collector; a second coating unit which discharges an electrode slurry to a second surface that is an opposite surface of a surface where an electrode current collector contacts a second coating roller while the electrode current collector passes through the second coating roller; and a secondary drying furnace which dries the electrode current collector having the second surface on which the electrode slurry has been coated, wherein the n is an integer between 1 and 20.

In a specific example, the heat pipe guide roller is positioned on a moving path of the electrode current collector between an exit of the primary drying furnace and an entrance of the second coating unit.

In a more specific example, 2 to 4 heat pipe guide rollers are positioned on a moving path of the electrode current collector between an exit of the primary drying furnace and an entrance of the second coating unit.

In further another example, in the second coating unit, a separation distance between an electrode slurry discharge part and a surface of the second coating roller satisfies a following condition 1:

$$|Gap_{side} - Gap_{center}| < 5 \ \mu m \qquad \text{[Condition 1]}$$

Herein, $Gap_{side}$ denotes the separation distance between the electrode slurry discharge part and the surface of the second coating roller at a side portion in a transverse direction (TD) of the second coating roller, and $Gap_{center}$ denotes the separation distance between the electrode slurry discharge part and the surface of the second coating roller at a central portion in the transverse direction (TD) of the second coating roller.

In a specific example, the second coating roller includes a flow path through which constant-temperature media pass therein.

In one example, the system for manufacturing an electrode according to the present invention further includes: an unwinder unit which is formed at a front end of the first coating unit and supplies the electrode current collector to the first coating unit; and a rewinder unit which is formed at a rear end of the secondary drying furnace and winds an electrode substrate which has been electrode-slurry-coated and dried.

In a specific example, the system further includes a conveyor line which consecutively transfers the electrode current collector until the electrode current collector is wound in the rewinder unit from a point of time when the electrode current collector is supplied from the unwinder unit.

In one example, the system further includes a reverse roller which is positioned between the primary drying furnace and the second coating unit and reverses positions of the first surface and the second surface of the electrode current collector.

In further another example, the system further includes a temperature sensor which detects a surface temperature of the electrode current collector which passes through the heat pipe guide roller.

Further, the present disclosure provides a method of manufacturing an electrode by using the above-described system. In one example, a method of manufacturing an electrode according to the present invention includes: first-coating an electrode slurry on a first surface of an electrode current collector in a state that the electrode current collector has been supported by a first coating roller; primary-drying the electrode current collector as the electrode current collector having the first surface, on which the electrode slurry has been coated, passes through a drying furnace; reducing a temperature deviation of the electrode current collector as the primary-drying-completed electrode current collector passes through n heat pipe guide rollers; second-coating an electrode slurry on a second surface of the electrode current collector in a state that the electrode current collector has been supported by a second coating roller; and secondary-drying the electrode current collector as the electrode current collector having the second surface, on which the electrode slurry has been coated, passes through a drying furnace, wherein the n is an integer between 1 and 20.

In one example, in the method, a temperature of each region of the electrode current collector after the reducing of the temperature deviation satisfies a following condition 2:

$$|T_{side} - T_{center}| < 2(^\circ \text{C.}) \qquad \text{[Condition 2]}$$

Herein, $T_{side}$ denotes an average value of temperatures at points corresponding to 10% and 90% in a width direction of the electrode current collector, and $T_{center}$ denotes a temperature at a center point in a width direction of the electrode current collector.

In one example, in the method of manufacturing an electrode according to the present invention, the first-coating and the secondary-drying are consecutively performed.

In further another example, the method further includes reversing the first surface and the second surface of the primary-drying-completed electrode current collector.

In one example, during the second-coating of the electrode slurry, a temperature deviation between a central portion and a side portion in a transverse direction (TD) of the second coating roller is equal to or less than 2° C. This can be performed by including a flow path through which constant-temperature media pass in the second coating roller.

In a specific example, the electrode to be manufactured is an electrode for a pouch-type secondary battery.

Advantageous Effects

According to an electrode manufacturing system and method of the present technology, it is possible to uniformly coat an electrode slurry by controlling the interval between an electrode current collector and the discharge port of an electrode slurry slot die at the time of second-coating an electrode slurry despite a change in temperature which occurs during the drying process after first-coating an electrode slurry on one surface of an electrode current collector.

BRIEF DESCRIPTION OF THE DRAWINGS

FIG. 1 illustrates a process of discharging an electrode slurry through an electrode slurry slot die on an electrode current collector located on a coating roller in a conventional manner.

FIG. 2 is a schematic diagram illustrating an electrode manufacturing system according to an embodiment of the present invention.

FIG. 3 shows a result obtained by photographing the surface temperature of the electrode current collector passing through the heat pipe guide roller using a thermal imaging camera.

FIG. 4 is a schematic diagram illustrating an electrode manufacturing system according to another embodiment of the present invention.

FIG. shows a result obtained by photographing the change in the surface temperature while an electrode current collector passes through 3 heat pipe guide rollers.

FIG. 6 is a schematic diagram showing locations where heat pipe guide rollers are formed in an electrode manufacturing system according to one embodiment of the present invention.

FIG. 7 is a result obtained by photographing the surface temperature of a second coating roller.

FIG. 8 shows a separation distance between the discharge unit of an electrode slurry slot die and a second coating roller of which the surface has been non-uniformly heated by an electrode current collector which has not been completely cooled.

FIG. 9 is a schematic diagram showing a second coating roller according to one embodiment of the present invention.

FIG. 10 is a schematic diagram showing a cross-sectional structure of a second coating roller according to one embodiment of the present invention.

FIG. 11 is a graph showing a result obtained by measuring the loading amount of an electrode slurry discharged from a second electrode slurry slot die, based on the difference in the deformation amount between the side portion and the central portion of the second coating roller.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present disclosure provides a system for manufacturing an electrode. In one example, a system for manufacturing an electrode according to the present technology includes: a first coating unit which discharges an electrode slurry to a first surface that is an opposite surface of a surface where an electrode current collector contacts a first coating roller while the electrode current collector passes through the first coating roller; a primary drying furnace which dries the electrode current collector having the first surface on which the electrode slurry has been coated; n heat pipe guide rollers which reduces a temperature deviation in a width direction of the electrode current collector having passed through the primary drying furnace by heating the electrode current collector; a second coating unit which discharges an electrode slurry to a second surface that is an opposite surface of a surface where an electrode current collector contacts a second coating roller while the electrode current collector passes through the second coating roller; and a secondary drying furnace which dries the electrode current collector having the second surface on which the electrode slurry has been coated, wherein the n is an integer between 1 and 20.

The number of the heat pipe guide rollers is in the range of 1 to 15, 1 to 10, 1 to 5, 2 to 4 or 2 to 3. It is possible to uniformly adjust a temperature of the electrode current collector having passed through a primary drying furnace in a width direction, and control the interval between the electrode current collector and the discharge port of the electrode slurry slot die at the time of second-coating the electrode slurry.

In a specific example, the heat pipe guide roller is positioned on a moving path of the electrode current collector between an exit of the primary drying furnace and an entrance of the second coating unit. In the present technology, the electrode current collector having passed through the primary drying furnace passes through the heat pipe guide roller before reaching the second coating unit. For example, the heat pipe guide roller can be formed at the exit of the primary drying furnace, the above-described middle point and/or a point before reaching the second coating unit, etc.

In a specific example, 2 to 4 heat pipe guide rollers are positioned on a moving path of the electrode current collector between an exit of the primary drying furnace and an entrance of the second coating unit. In the present technology, one or more heat pipe guide rollers can be formed. In the case that one heat pipe guide roller is formed, the temperature deviation in the width direction of the electrode current collector can be controlled to be equal to or less than 2° C. Further, in the case that two or more heat pipe guide rollers are formed, the temperature deviation in the width direction of the electrode current collector can be controlled to be equal to or less than 1° C. However, it has been found by experiments that when 5 or more heat pipe guide rollers are applied, the efficiency according thereto decreases.

In one example, in the second coating unit, a separation distance between an electrode slurry discharge part and a surface of the second coating roller satisfies a following condition 1:

$$|Gap_{side} - Gap_{center}| < 5 \ \mu m \qquad \text{[Condition 1]}$$

Herein, $Gap_{side}$ denotes the separation distance between the electrode slurry discharge part and the surface of the second coating roller at a side portion in a transverse direction (TD) of the second coating roller, and $Gap_{center}$ denotes the separation distance between the electrode slurry discharge part and the surface of the second coating roller at a central portion in the transverse direction (TD) of the second coating roller.

In the present disclosure, the "central portion" of the roller means the center point of the roller in the width direction or transverse direction (TD). Further, the "side portion" of the roller means points corresponding to 10% and 90% of the roller in the width direction or transverse direction (TD). For example, the separation distance or temperature of the "side portion" of the roller means the average value of the numerical values measured at points corresponding to 10% and 90% on the length in the width direction or TD direction of the roller.

When manufacturing an electrode, a process of forming an electrode mixture layer on each of two surfaces of the electrode current collector is applied. The electrode substrate having gone through the first coating process and the primary drying process is subject to the second coating process. When the second coating process is applied to the electrode current collector which has not been completely cooled after the primary drying process, heat is transferred to the coating roller. The coating roller is heated by transferred heat, and different volume expansions are shown by regions.

In the present technology, it is possible to maintain the separation distance between the electrode slurry discharge part and the surface of the second coating roller constant in the second coating unit by controlling the temperature in the width direction for the electrode current collector in advance before performing the second coating process. The value of the above-described condition 1 may be less than 5 μm, and specifically in the range of 0.01 to 5 μm, 0.1 to 5 μm, 1 to 5 μm, 1.5 to 4.5 μm, 2 to 4 μm, or 1 to 3 μm. In the present technology, when the condition 1 satisfies 0 μm, it means that the diameters of the second coating roller by regions are the same, and the value 0.01 μm has been decided in consideration of the measurement limit.

In one example, the second coating roller includes a flow path through which constant-temperature media pass therein. In the present technology, a uniform temperature can be simultaneously implemented by regions while controlling the temperature of the second coating roller to be in a specific range by forming a flow path, through which constant-temperature media pass, in the second coating roller. The present technology is distinguished from a technology of inducing deformation of a specific region of the coating roller by heating or cooling the region.

In the present technology, "constant-temperature media" means media controlled to be maintained at a temperature in a specific range and may be gaseous or liquid media. Specifically, the constant-temperature media is water or oil in a constant-temperature state, or air or inert gas which is controlled in the temperature to be in a specific range. For example, the constant-temperature media may be constant-temperature water.

The electrode current collector having passed through the above-described primary drying furnace has not been completely cooled. For example, the temperature of the electrode current collector may be 300° C. or higher. If the electrode current collector passes through the second coating roller in a state that contacts the second coating roller, the surface temperature of the second coating roller is also heated to be in a similar temperature range. The second coating roller, which has been heated to a high temperature, shows a non-uniform temperature distribution by regions and shows different volume expansion rates in the central portion and the side portion. According to the present technology, it is possible to resolve temperature non-uniformity of the roller itself and maintain a temperature, at which the difference in the volume expansion rates by regions less occurs, by forming a flow path, through which constant-temperature media pass, in the second coating roller.

For example, assuming that a coating roller was made of aluminum or its alloy, and the thickness of the outer diameter was 1 T, the difference in the deformation amount between the central portion and the side portion in the case that the temperature of the roller was in the range of 26 to 27° C. is greater than the difference in the deformation amount in the case that the temperature of the roller was in the range of 32 to 33° C. Hence, the present technology not only simply lowers the temperature of the coating roller, but also controls the temperature of the coating roller to reduce the difference in the deformation amount by regions of the coating roller.

In one embodiment, the second coating roller includes a surface of rotation of a roller; a rotation shaft which gives driving force to the surface of rotation of the roller; a temperature controller including a heater which heats inflowing cooling water; and constant-temperature water flow path through which constant-temperature water supplied from the temperature controller passes through, in a state that has supported an electrode current collector. For example, the constant-temperature water flow path is equally distributed on the inner surface of the surface of rotation of the roller. Through this, in the present technology, it is possible to control the temperature of the outer diameter of the second coating roller to be maintained constant.

In a specific example, the constant-temperature water flow path has a water jacket shape in which the inner surface of the second coating roller is equally heated. The constant-temperature water flow path of the water jacket shape may be closely attached to the inner surface of the second coating roller. The surface temperature of the second coating roller may be controlled to be in the range of 31 to 33° C. through the constant-temperature water.

In one example, the system for manufacturing an electrode according to the present technology further includes: an unwinder unit which is formed at a front end of the first coating unit and supplies the electrode current collector to the first coating unit; and a rewinder unit which is formed at a rear end of the secondary drying furnace and winds an electrode substrate which has been electrode-slurry-coated and dried. The electrode current collector of a metal foil form is supplied in a state that has been wound in the unwinder unit. The supplied electrode current collector sequentially passes through a first coating unit which discharges an electrode slurry on a first surface of the electrode current collector, a primary drying furnace, a second coating unit which discharges an electrode slurry on a second surface of the electrode current collector, and a secondary drying furnace, and is then wound on a rewinder unit. After an electrode slurry is coated on two surfaces of the electrode current collector and is then dried, the electrode current collector passes through a slitting unit and a punching unit, etc.

In a specific example, the system for manufacturing an electrode according to the present invention further includes a conveyor line which consecutively transfers the electrode current collector until the electrode current collector is wound in the rewinder unit from a point of time when the electrode current collector is supplied from the unwinder unit. According to the electrode manufacturing system of the present technology, it is possible to increase the process efficiency and product uniformity by manufacturing an electrode through a consecutive process. The conveyor line consecutively supplies and transfers an electrode current collector, and the electrode current collector sequentially passes through a first coating unit, a primary drying furnace, a second coating unit, and a secondary drying furnace.

In one example, the system further includes a reverse roller which is positioned between the primary drying furnace and the second coating unit and reverses positions of the first surface and the second surface of the electrode current collector. For example, the electrode current collector, which has passed through the first coating unit and the primary drying furnace, reaches the second coating unit after going through a process where the locations of the upper and lower surfaces are reversed by a reverse roller. In this case, the electrode current collector is moved in a machine direction (MD), and the upper and lower locations are reversed in a transverse direction (TD). In another example, in an electrode manufacturing system according to the present technology, the first coating unit and the primary drying furnace are positioned at the lower end, and the second coating unit is positioned at the upper end. As such, the moving direction of the electrode current collector having passed through the primary drying furnace is changed from the first direction to the second direction to thereby pass through the second coating unit.

In one embodiment, an electrode manufacturing system according to the present technology includes a temperature sensor which detects a surface temperature of the second coating roller by regions. The temperature sensor may measure the average temperature of the second coating roller. However, it is also possible that the second coating roller is divided into a plurality of regions in a transverse direction (TD) and the temperature is measured by divided regions. It is possible to predict and calculate the separation distance with the slurry discharge unit of the second coating unit by regions by dividing the second coating roller into 3 to 10 regions in the transverse direction (TD) and measuring the temperature by regions.

Further, the present disclosure provides a method of manufacturing an electrode by using the above-described system. In one example, a method of manufacturing an electrode according to the present invention includes: first-coating an electrode slurry on a first surface of an electrode current collector in a state that the electrode current collector has been supported by a first coating roller; primary-drying the electrode current collector as the electrode current collector having the first surface, on which the electrode slurry has been coated, passes through a drying furnace; reducing a temperature deviation of the electrode current collector as the primary-drying-completed electrode current collector passes through n heat pipe guide rollers; second-coating an electrode slurry on a second surface of the electrode current collector in a state that the electrode current collector has been supported by a second coating roller; and secondary-drying the electrode current collector as the electrode current collector having the second surface, on which the electrode slurry has been coated, passes through a drying furnace, wherein the n is an integer between 1 and 20.

In one example, in the method, a temperature of each region of the electrode current collector after the reducing of the temperature deviation satisfies a following condition 2:

$$|T_{side} - T_{center}| < 2(° C.) \qquad \text{[Condition 2]}$$

Herein, $T_{side}$ denotes an average value of temperatures at points corresponding to 10% and 90% in a width direction of the electrode current collector, and $T_{center}$ denotes a temperature at a center point in a width direction of the electrode current collector.

Specifically, in the condition 2, the deviation between the temperature of the central portion and the temperature of the side portion of the electrode current collector may be less than 2° C., or specifically in the range of 0.01 to 2° C., 0.1 to 2° C., 0.2 to 2° C., 1.2 to 2° C., 0.2 to 0.9° C., or 0.3 to 0.7° C. The present technology minimizes the temperature deviation by regions in the width direction of the electrode current collector and specifically controls the temperature deviation to be in a specific range. Through this, the discharge amount of the electrode slurry discharged to the electrode current collector is controlled at the second-coating process.

In one example, in the method of manufacturing an electrode according to the present invention, the first-coating to the secondary-drying are consecutively performed. This can be performed through the conveyor line which consecutively transfers the electrode current collector, and the process efficiency and product uniformity can be enhanced.

In further another example, the method may further include reversing the first surface and the second surface of the primary-drying-completed electrode current collector. The reversing operation can be performed through a reverse roller, etc., and after primary-drying the electrode current collector of which the first surface has been coated by an electrode slurry, an electrode slurry is coated on the second surface of the electrode current collector.

Particularly, in the second coating roller, a temperature deviation between a central portion and a side portion in a transverse direction (TD) of the second coating roller is equal to or less than 2° C. Specifically, in the second coating roller, the temperature deviation between the central portion and the side portion may be less than 2° C., or in the range of 0.01 to 2° C., or 0.5 to 1.5° C. The present technology minimizes the temperature deviation by regions based on the surface temperature of the second coating roller and specifically controls the temperature deviation to be in a specific range. Through this, the discharge amount of the electrode slurry discharged to the electrode current collector passing through the second coating roller is controlled.

In one embodiment, the second coating roller circulates the constant-temperature media through a flow path formed in the roller. The constant-temperature media is water or oil in a constant-temperature state, or air or inert gas which is controlled in the temperature to be in a specific range. For example, the constant-temperature media may be constant-temperature water.

In a specific example, the temperature of the central portion and the side portion in a transverse direction (TD) of the second coating roller may be in the range of 30 to 33° C., respectively. Specifically, the temperature of the central portion and the side portion of the second coating roller may be in the range of 31 to 33° C., respectively. In the presenttechnology, it was found that the deformation amounts of two points can be regulated to be the same or at a same level.

In a specific example, the electrode to be manufactured is an electrode for a pouch-type secondary battery. Further, the electrode slurry is a generic term for a composition in a slurry state containing an electrode active material. The positive electrode or negative electrode means an electrode for a secondary battery, and specifically means an electrode for a lithium secondary battery.

In one example, the electrode means a positive electrode and/or a negative electrode of a lithium secondary battery.

The positive electrode has a structure in which a positive electrode active material layer of a two-layer structure is stacked on a positive electrode current collector. In one example, the positive electrode active material layer includes a positive electrode active material, a conductive material, and a binder polymer, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0≤y<1)$, $Li_xNi_{1-y}Mn_yO_2(0.5<x<1.3, 0≤y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}CO_zO_4$ $(0.5<x<1.3, 0<<<2)$, $Li_xCoPO_4(0.5<x<1.3)$ and $Li_xFePO_4$ $(0.5<x<1.3)$, and the lithium-containing transition metal oxide may be coated with a metal or metal oxide such as aluminum (Al). Further, in addition to the lithium-containing transition metal oxide, at least one selected from the group consisting of sulfide, selenide, and halide may be used.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, Ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

The negative electrode has a structure in which a negative electrode active material layer of a two-layer structure is stacked on a negative electrode current collector. In one example, the negative electrode active material layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon are typical. Representative examples of high crystalline carbon include one or more selected from the group consisting of natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

Detailed Description of the Preferred Embodiments

Hereinafter, the present invention will be described in more detail through drawings and the like. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIG. 2 is a schematic diagram illustrating an electrode manufacturing system according to an embodiment of the present invention. Referring to FIG. 2, an electrode current collector 110 is supplied from an unwinder 151. The supplied the electrode current collector 110 passes through a first coating roller 131. When the electrode current collector 110 passes through the first coating roller 131, an electrode slurry is discharged from an electrode slurry slot die 121 to thereby form a first electrode mixture layer 111 on a first surface of the electrode current collector 110. After the electrode current collector 110 passes through the primary drying furnace 141, the first surface and the second surface of the electrode current collector 110 are reversed by a reverse roller (not shown). The electrode current collector 110 passes through the second coating roller 100, and at this time, an electrode slurry is discharged from the second electrode slurry slot die 122 to thereby form a second electrode mixture layer 112. Thereafter, the electrode current collector 110 passes through the secondary drying furnace 142 and is then wound on a rewinder 152.

In FIG. 2, the electrode current collector 110 having passed through the primary drying furnace 141 passes through the second coating roller 100 in a state that the cooling has not been completed. At this time, the surface of the second coating roller 100 is non-uniformly heated by the electrode current collector 110 which has not been completely cooled. Different volume expansions are induced by regions of the second coating roller 100 which has been non-uniformly heated, and the separation distance with the discharge unit of the electrode slurry slot die 122 becomes non-uniform according to the temperature.

In the present technology, the electrode current collector 110 having passed through the primary drying furnace 141 passes through a heat pipe guide roller. The heat pipe guide roller 101 has a heating coil or a constant-temperature water flow path therein. Through this, the heat pipe guide roller 101 controls the electrode current collector 110 to have a constant temperature in the width direction.

FIG. 3 shows a result obtained by photographing the surface temperature of the electrode current collector 110 passing through the heat pipe guide roller 101 using a thermal imaging camera. Referring to FIG. 3, the temperature of the electrode current collector 100, which has been heated while passing through the primary drying furnace 141, is not uniform in a width direction (transverse direction (TD)). It is seen that as the electrode current collector 110 passes through the heat pipe guide roller 101, the temperature non-uniformity problem has been significantly resolved.

As such, according to the present technology, the temperature non-uniformity in the width direction of the electrode current collector 101 can be effectively resolved by locating the heat pipe guide roller 101 at the exit side of the primary drying furnace 141.

Second Embodiment

FIG. 4 is a schematic diagram illustrating an electrode manufacturing system according to another embodiment of the present invention. Referring to FIG. 4, the electrode current collector 110 supplied from an unwinder 151 passes through a first coating unit including a first coating roller 131 and an electrode slurry slot die 121; a primary drying furnace 141; a second coating unit including a second electrode slurry slot die 122; and a secondary drying furnace 142, and is then wound on a rewinder 152. 3 heat pipe guide rollers 101, 102 and 103 are positioned on the moving path of the electrode current collector 110 between the primary drying furnace 141 and the second coating unit. Heat pipe guide rollers 101, 102 and 130 are respectively positioned at the exit of the primary drying furnace 141, the middle point and a point before reaching the second coating unit.

Further, FIG. 5 is a schematic diagram showing a result obtained by photographing the surface temperature of the electrode current collector 110 using a thermal imaging camera while passing through 3 heat pipe guide rollers 101, 102 and 103. The temperature of the electrode current collector 110, which passed through the primary drying furnace 141 and was heated, is non-uniform in the width direction (transverse direction (TD)), and the temperature non-uniformity rapidly decreases as the electrode current collector 110 sequentially passes through 3 heat pipe guide rollers 101, 102 and 103.

Third Embodiment

In the present technology, the temperature deviation in the width direction of the electrode current collector according to the location of the heat pipe guide roller was measured. Specifically, in the electrode manufacturing system, one heat pipe guide roller was installed at one place and the locations are points indicated by (1) to (5) of FIG. 6. The surface temperature of the heat pipe guide roller was controlled to be 30° C. The results are shown in Table 1. In Table 1, the temperature of the side portion is the average value of temperatures measured at points corresponding to 10% and 90% in the width direction of the electrode current collector,

US 12,562,361 B2

13 and the temperature of the central portion is the temperature of the central portion of the electrode current collector based on the length in the width direction. In examples 1 to 3, the temperature of the electrode current collector was measured at a point (position (5)) before the electrode current collector reached the second coating unit.

TABLE 1

| Example No. | Position | Side portion temperature (° C.) | Central portion temperature (° C.) | Deviation (° C.) |
|---|---|---|---|---|
| Example 1 | (1) Exit of primary drying furnace | 36.8 | 38.3 | 1.5 |
| Example 2 | (3) Middle point | 32.3 | 34.1 | 1.8 |
| Example 3 | (5) Before reaching second coating unit | 26.9 | 28.8 | 1.9 |

Referring to Table 1, when applying one heat pipe guide roller, the temperature deviation of the side portion and the central portion of the electrode current collector can be controlled to be equal to or less than 2° C. The temperature deviation may be changed according to the location at which the heat pipe guide roller is applied, but it is seen that as the heat pipe guide roller gets closer to the exit of the primary drying furnace, the effect of reducing the temperature deviation increases.

For reference, in a comparative example, when a heat pipe guide roller is not applied, the temperature deviation between the side portion and the central portion of the electrode current collector before reaching the second coating unit (position (5)) was 2.8° C.

Fourth Embodiment

In the present technology, the temperature deviation in the width direction of the electrode current collector according to the location of the heat pipe guide roller was measured. Specifically, in the electrode manufacturing system, 2 to 5 heat pipe guide rollers were installed and the locations are points indicated by (1) to (5) of FIG. 6. The surface temperature of the heat pipe guide roller was controlled to be 30° C. The results are shown in Table 2. In Table 2, the temperature of the side portion is the average value of temperatures measured at points corresponding to 10% and 90% in the width direction of the electrode current collector, and the temperature of the central portion is the temperature of the central portion of the electrode current collector based on the length in the width direction. The temperature of the electrode current collector was measured at a point (position (5)) before the electrode current collector reaches the second coating unit.

14

Referring to Table 2, as the number of heat pipe guide rollers increases, the temperature deviation in the width direction of the electrode current collector significantly decreases. Specifically, in the case that two or more heat pipe guide rollers are applied, the temperature deviation in the width direction of the electrode current collector is con-trolled to be equal to or less than 1° C. However, when 5 or more heat pipe guide rollers are applied, the efficiency according thereto decreases.

Fifth Embodiment

The result obtained by photographing the surface temperature of the second coating roller 100 using a thermal imaging camera is shown in FIG. 7. Referring to FIG. 7, the surface of the second coating roller 100 is non-uniformly heated by the electrode current collector 110, which has not been completely cooled, specifically the electrode current collector having one surface to which an electrode slurry has been applied. Specifically, the temperature of the central portion of the second coating roller 100 is about 299.24° C., and the temperature of two side portions is about 299.15° C. Likewise, the volume of the second coating roller 100, which has been heated to a high temperature, is rapidly expanded, and the separation distance with the discharge unit of the electrode slurry slot die may become non-uniform according to the temperature.

FIG. 8 schematically shows a separation distance between the discharge unit of an electrode slurry slot die and a second coating roller of which the surface has been non-uniformly heated by an electrode current collector (omitted) which has not been completely cooled. Referring to FIG. 8, the second coating roller 100 includes a roller surface which rotates around a roller rotation shaft. The second coating roller shows different expansion rates by regions according to the change of the surface temperature. As such, as shown in FIG. 8, the diameter of the central portion of the second coating roller 100 becomes greater than the diameter of the side portion of the second coating roller 100. The non-uniform expansion of the second coating roller 100 causes

TABLE 2

| Example No. | No. of rollers | Position | Side portion temperature (° C.) | Central portion temperature (° C.) | Deviation (° C.) |
|---|---|---|---|---|---|
| Example 4 | 2 | (1), (5) | 28.2 | 27.5 | 0.7 |
| Example 5 | 3 | (1), (3), (5) | 28.0 | 27.7 | 0.3 |
| Example 6 | 4 | (1), (2), (3), (5) | 28.0 | 27.8 | 0.2 |
| Example 7 | 5 | (1), (2), (3), (4), (5) | 27.9 | 27.8 | 0.2 | the non-uniform separation distance between the second coating roller 100 and the discharge unit of the electrode slurry slot die 122.

In this regard, according to the present technology, it is possible to allow the second coating roller 100 to maintain a uniform temperature throughout the entire region by forming a flow path through which constant-temperature media pass in the second coating roller 100. Through this, it is possible to maintain the separation distance between the second coating roller 100 and the discharge unit of the electrode slurry slot die 122 constant.

Sixth Embodiment

FIG. 9 is a schematic diagram showing a second coating roller according to one embodiment of the present invention. Referring to FIG. 9, the second coating roller 200 is fastened to the drive motor 210 and is rotated and has a structure where a flow path for constant-temperature water is formed therein. The temperature of the constant-temperature water is maintained constant at about 32° C. by a temperature controller 220 including a heater 221. Constant-temperature water heated in the temperature controller 220 flows into a second coating roller 220 through constant-temperature water inflow path 201. The inflowing constant-temperature water circulates at the inside of the second coating roller 200 and is then discharged through a constant-temperature water outflow path 202. Further, the temperature controller heats cooling water inflowing through a cooling water inflow path 231, and the used cooling water is discharged through a cooling water outflow path 232.

Seventh Embodiment

FIG. 10 is a schematic diagram showing a cross-sectional structure of a second coating roller according to one embodiment of the present invention. The second coating roller 300 includes a roller surface 310 which is rotated around a roller rotation shaft 320 and has a water jacket 301 to be closely attached to the inner surface of the roller surface 310. Constant-temperature water passes through the inside of the water jacket 301 and induces the roller surface 310 to be maintained at a constant temperature.

8th Embodiment

The level of volume expansion according to the temperature by regions of the second coating roller was calculated. Specifically, a constant-temperature water jacket is formed at the inside of the second coating roller, and the surface temperature of the second coating roller according to the temperature of constant-temperature water was measured. Further, the displacement amount by the volume expansion according to the temperature by points of the second coating roller was measured. The results are shown in Table 3. A roller having a length of 1200 mm in a transverse direction (TD) was used as the second coating roller, and the central portion of the second coating roller means the middle point in the transverse direction (TD) of the second coating roller. Further, the side portion of the second coating roller indicates the average value at two points corresponding to 480 mm from the center point in the transverse direction (TD) of the second coating roller.

TABLE 3

| Side portion of second coating roller | | Central portion of second coating roller | |
|---|---|---|---|
| Temperature (° C.) | Deformation amount (μm) | Temperature (° C.) | Deformation amount (μm) |
| 22 | 0 | 22 | 0 |
| 26 | 11 | 26 | 13 |
| 29 | 20 | 30 | 23 |
| 31 | 28 | 33 | 29 |
| 32 | 30 | 33 | 30 |
| 33 | 32 | 33 | 31 |
| 34 | 33 | 34 | 31 |

Referring to FIG. Table 3, when temperatures of the side portion and the central portion of the second coating roller are 26° C., respectively, the difference in deformation amounts of two points is 2 μm. Further, when temperatures of the side portion and the central portion of the second coating roller are 34° C., respectively, the difference in deformation amounts of two points is 2 μm.

In this regard, if temperatures of the side portion and the central portion of the second coating roller are controlled to be in the range of 30 to 33° C. and specifically 31 to 33° C., the difference in deformation amounts of two points is controlled to be equal to or less than 1 μm. Particularly, when the temperature of the side portion of the second coating roller is 32° C., and the temperature of the central portion of the second coating roller is 33° C., the deformation amounts at two points are the same.

Through this, it is understood that it is not that the deformation amount by points becomes small by maintaining the temperature of the second coating roller at a room temperature or controlling the temperature of the second coating roller to be at a high temperature.

Further, in the present technology, the loading amount of the electrode slurry discharged from the electrode slurry slot die was measured based on the above-described difference in the deformation amount between the side portion and the central portion of the second coating roller. Specifically, the amount of electrode slurry loaded to the electrode current collector on the second coating roller was measured in a transverse direction (TD). The measured results are shown in FIG. 11.

Referring to FIG. 11, the loading amounts of the electrode slurry are changed in the width direction of two sides based on the center (position 0 mm) in the transverse direction (TD) of the second coating roller. Specifically, when the difference in the deformation amount between the side portion and the central portion of the second coating roller is 0 or 2 μm, the difference in the loading amount between the side portion and the central portion of the second coating roller does exceed 5 mg/25 cm². In this regard, when the deformation amount between the side portion and the central portion of the second coating roller is 4 μm, the difference in the loading amount between the side portion and the central portion is about 7 mg/25 cm². Further, when the deformation amount between the side portion and the central portion of the second coating roller is 8, 12 or 16 μm, the difference in the loading amount between the side portion and the central portion is about 15 mg/25 cm² or higher.

In the present technology, the temperature of the side portion and the central portion of the second coating roller is controlled to be in the range of 31 to 33° C., and the temperature difference between two portions is equal to or less than 2° C. Through this, the difference in the loading amount of the electrode slurry in the width direction can be controlled to be equal to or less than 5 mg/25 cm$^2$.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 110: electrode current collector
11: electrode mixture layer
20: electrode slurry slot die
21: electrode slurry discharge unit
30: coating roller
100, 200, 300: second coating roller
101, 102, 103: heat pipe guide roller
111: first electrode mixture layer
112: second electrode mixture layer
121: first electrode slurry slot die
122: second electrode slurry slot die
131: first coating roller
141: primary drying furnace
142: secondary drying furnace
151: unwinder
152: rewinder
201: constant-temperature water inflow path
202: constant-temperature water outflow path
210: drive motor
220: temperature controller
221: heater
231: cooling water inflow path
232: cooling water outflow path
301: water jacket
310: roller surface
320: roller rotation shaft
(1), (2), (3), (4), (5): location of heat pipe guide roller

The invention claimed is:

1. A system for manufacturing an electrode, the system comprising:
   a first coater configured to discharge an electrode slurry to a first surface that is an opposite surface of a surface where an electrode current collector contacts a first coating roller while the electrode current collector passes through the first coating roller;
   a primary drying furnace configured to dry the electrode current collector having the first surface on which the electrode slurry has been coated;
   n heat pipe guide rollers configured to reduce a temperature deviation in a width direction of the electrode current collector having passed through the primary drying furnace by heating the electrode current collector, wherein the n is an integer between 1 and 20;
   a second coater configured to discharge the electrode slurry to a second surface that is an opposite surface of a surface where the electrode current collector contacts a second coating roller while the electrode current collector passes through the second coating roller; and
   a secondary drying furnace configured to dry the electrode current collector having the second surface on which the electrode slurry has been coated, so as to form an electrode substrate, wherein in the second coater, a separation distance between an electrode slurry discharge part and a surface of the second coating roller satisfies a following condition 1:

$$|Gap_{side}-Gap_{center}|<5 \ \mu m \qquad \text{[Condition 1]}$$

wherein $Gap_{side}$ denotes the separation distance between the electrode slurry discharge part and the surface of the second coating roller at a side portion in a transverse direction (TD) of the second coating roller, and wherein $Gap_{center}$ denotes the separation distance between the electrode slurry discharge part and the surface of the second coating roller at a central portion in the transverse direction (TD) of the second coating roller.

2. The system of claim 1, wherein the n heat pipe guide roller is positioned on a moving path of the electrode current collector between an exit of the primary drying furnace and an entrance of the second coater.

3. The system of claim 1, wherein the n heat pipe guide rollers in an amount ranging from 2 to 4 are positioned on a moving path of the electrode current collector between an exit of the primary drying furnace and an entrance of the second coater.

4. The system of claim 1, wherein the second coating roller includes a flow path through which constant-temperature media is configured to pass.

5. The system of claim 1, further comprising:
   an unwinder positioned at a front end of the first coater and configured to supply the electrode current collector to the first coater; and
   a rewinder positioned at a rear end of the secondary drying furnace and configured to wind the electrode substrate which has been electrode-slurry-coated and dried.

6. The system of claim 5, further comprising: a conveyor line configured to consecutively transfer the electrode current collector until the electrode current collector is wound in the rewinder from a point of time when the electrode current collector is supplied from the unwinder.

7. The system of claim 1, further comprising a reverse roller which is positioned between the primary drying furnace and the second coater and is configured to reverse positions of the first surface and the second surface of the electrode current collector.

8. The system of claim 1, further comprising a temperature sensor configured to detect a surface temperature of the electrode current collector which passes through the n heat pipe guide rollers.

9. A method of manufacturing an electrode with the system of claim 1, the method comprising:
   first-coating the electrode slurry on the first surface of the electrode current collector in a state in which the electrode current collector has been supported by the first coating roller;
   primary-drying the electrode current collector as the electrode current collector having the first surface, on which the electrode slurry has been coated, passes through the primary drying furnace;
   reducing a temperature deviation of the electrode current collector as a primary-drying-completed electrode current collector passes through the n heat pipe guide rollers, wherein the n is an integer between 1 and 20;
   second-coating the electrode slurry on the second surface of the electrode current collector in a state in which the electrode current collector has been supported by the second coating roller; and secondary-drying the electrode current collector as the electrode current collector having the second surface, on which the electrode slurry has been coated, passes through the secondary drying furnace.

10. The method of claim 9, wherein a temperature of each region of the electrode current collector after the reducing of the temperature deviation satisfies a following condition 2:

$$|T_{side}-T_{center}|<2(° C.) \qquad \text{[Condition 2]}$$

wherein $T_{side}$ denotes an average value of temperatures at points corresponding to 10% and 90% in a width direction of the electrode current collector, and wherein $T_{center}$ denotes a temperature at a center point in the width direction of the electrode current collector.

11. The method of claim 9, wherein the first-coating to the secondary-drying are consecutively performed.

12. The method of claim 9, further comprising: reversing the first surface and the second surface of the primary-drying-completed electrode current collector.

13. The method of claim 9, wherein during the second-coating of the electrode slurry, a temperature deviation between a central portion and a side portion in a transverse direction (TD) of the second coating roller is equal to or less than 2° C.

14. The method of claim 9, wherein the electrode to be manufactured is an electrode for a pouch-type secondary battery.

* * * * *